United States Patent [19]

Singleton

[11] Patent Number: 4,950,526

[45] Date of Patent: Aug. 21, 1990

[54] WEB MATERIAL

[75] Inventor: Michael Singleton, Yalding, Great Britain

[73] Assignee: Kimberly-Clark Limited, Larkfield, Near Maidstone, England

[21] Appl. No.: 337,217

[22] Filed: Apr. 12, 1989

Related U.S. Application Data

[63] Continuation of Ser. No. 94,947, Sep. 9, 1987, abandoned.

[30] Foreign Application Priority Data

Sep. 11, 1986 [GB] United Kingdom ............... 8621917

[51] Int. Cl.$^5$ .................... A47K 3/02; B32B 5/26; D04H 3/14; D04H 5/06
[52] U.S. Cl. ........................................ 428/166; 4/583; 428/171; 428/172; 428/198; 428/200; 428/286; 428/287; 428/296; 428/309.9; 428/311.1; 428/311.5; 428/311.7; 428/317.3; 428/317.5; 428/317.7; 428/317.9; 428/319.3; 428/319.9; 428/340; 428/908.8
[58] Field of Search ............... 428/166, 171, 172, 198, 428/200, 286, 287, 296, 309.9, 311.1, 311.5, 311.7, 317.3, 317.5, 317.7, 317.9, 319.3, 319.9, 340, 908.8; 4/583

[56] References Cited

U.S. PATENT DOCUMENTS

| | | | |
|---|---|---|---|
| 4,041,203 | 8/1974 | Brock et al. | 428/157 |
| 4,042,740 | 9/1974 | Krueger | 428/138 |
| 4,100,324 | 7/1978 | Anderson et al. | 428/288 |
| 4,436,780 | 3/1984 | Hotchkiss et al. | 428/198 |
| 4,600,620 | 7/1986 | Lloyd et al. | 428/195 |
| 4,609,580 | 9/1986 | Rockett et al. | 428/198 |
| 4,614,679 | 9/1986 | Farrington et al. | 428/138 |
| 4,644,592 | 2/1987 | Small | 4/583 |
| 4,784,892 | 11/1988 | Slorey et al. | 428/198 |

FOREIGN PATENT DOCUMENTS 0101306  11/1983  European Pat. Off. .
0188005  3/1985  European Pat. Off. .

OTHER PUBLICATIONS

European Search Report, Application No. EP 87307942.

Primary Examiner—James C. Cannon
Attorney, Agent, or Firm—William D. Herrick

[57] ABSTRACT

Disposable mat material comprising an abrasion resistant pervious layer of a non-woven web of bonded filaments and an absorbent layer of microfibres, the pervious and absorbent layers being bonded intermittently, characterized in that the bonds penetrate through the pervious layer and join the fibres in that layer with those in the absorbent layer. Thus water, for example, on the feet of a user, rapidly penetrates to the absorbent layer from the outer abrasion resistant layer. The bond areas not only aid the rapid absorbence, but also provide 'pockets' giving an enhanced roughness.

9 Claims, 1 Drawing Sheet

WEB MATERIAL

This is a continuation of U.S. application Ser. No. 07/094,947, filed on Sept. 9, 1987, and now abandoned.

This invention relates to material for use as a mat or the like intended to be positioned, for example, at the entrance from a dirty area to a clean area e.g. at the door of a house or at a location where there is likely to be spillage of liquid such as a kitchen or the area surrounding a vending machine in an office or factory.

Hitherto such mats have normally been made, for example, of tufted fabric. However, proposals have been made for a sheet of mat material to be held in a holder, the sheet being disposable and being made of relatively cheap and absorbent material such as paper.

One suitable type of disposable mat material is disclosed in published European Application No. 0188005A. The mat described in that specification essentially comprises a wear surface layer made of non-woven continuous filament nylon and an absorbent inner layer made of a mixture of polymeric microfibres and wood pulp, a liquid impervious backing layer being normally provided. The layers of material are intermittently bonded to prevent separation in use.

Material in accordance with the present application suitable for a disposable mat comprises an abrasion resistant pervious outer layer preferably of a non-woven web of bonded filaments (either continuous or non-continuous) and an inner absorbent layer of microfibres and, preferably absorbent particles and/or fibres, the abrasion and absorbent layers being bonded intermittently, the bonds preferably being arranged in a regular pattern and penetrating (burning) through the outer layer so as to join the fibres in the outer layer with similar fibres in the absorbent layer.

The bond areas thus form 'pockets' in the outer abrasion resistant layer which 'pockets' tend to give an enhanced and desirable roughness to that layer and also act to hold dirt and dust.

The bonds are preferably positioned close together (for example about 3.5 mm apart) to give good abrasion characteristics and the pattern of bonds is preferably that of a diamond or square.

The bonds are preferably created by ultrasonic or thermal bonding which acts to burn through the outer layer and create molten bonds between the fibres in the outer and central layers.

The abrasion resistant layer is preferably non-woven spun bonded polypropylene which is treated with or contains a surfactant to increase the wetability. It has a basis weight of about 100 grammes per square meter.

The relatively absorbent inner or central layer preferably comprises meltblown polymeric fibres e.g., polypropylene and wood pulp fibres giving good absorbency together with a relatively coherent structure due to the entanglement of the fibres and pulp. Other absorbent particles or fibres may be used.

Preferably, the central "layer" has 30% polypropylene and 70% wood pulp with the basis weight being 190 grammes per square meter. This absorbent central layer is preferably also treated with a surfactant.

A waterproof backing layer is preferably provided which may conveniently be a sheet of 38 microns polyethylene, the backing sheet being stuck or otherwise joined to the absorbent inner layer either by the same bonding process which acts to bond the abrasion resistant and the absorbent layers or preferably with adhesive of the like to prevent holes being punched through the complete material which may act to nullify the effect of the waterproof barrier.

An example of mat material in accordance with the invention is illustrated in the accompanying sketch drawings in which.

Figure 1:
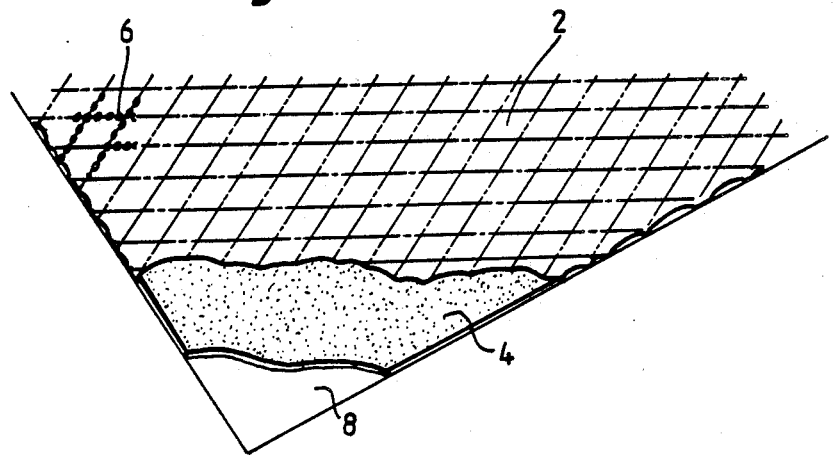
FIG. 1 is a perspective view of a 'cut away' cover of the material.
Figure 2:
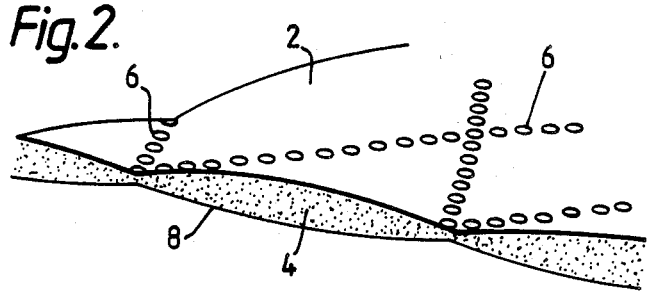
FIG. 2 is an 'end on' view of a cover of the material.

Referring to the drawings, the material comprises an absorbent resistant outer layer 2 of spun bonded polypropylene which is joined to an inner absorbent layer 4 of meltblown microfibres and absorbent pulp fibres by means of a series of closely spaced bond areas 6 formed in a rectangular or diamond pattern. The distance between adjacent bond areas is about 3.5 mm and the distance between the parallel lines of the bond pattern is about 38 mm.

Figure 3:
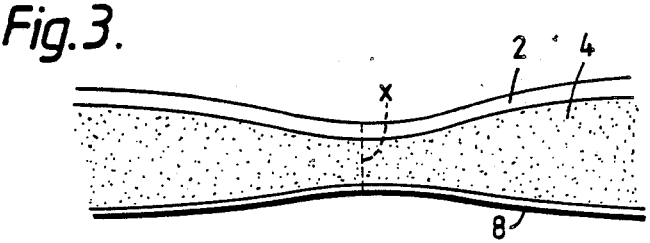
FIG. 3 is a cross section, to an enlarged scale, taken between bond areas.
Figure 4:
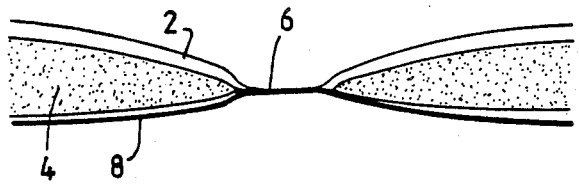
FIG. 4 is a cross section of the material taken through a bond area.

The bond areas 6 are in the form of depressions in the outer surface of the abrasion resistant layer 2 providing 'pockets' in which dirt or dust can be trapped. The bond areas 6 are burnt through the outer layer during manufacture so as to join the polymeric continuous fibres of the outer layer with molten polymeric fibres in the central absorbent layer 4. This creates a very good and strong connection between the two layers whilst, at the same time, allowing liquid to pass readily from the pervious outer layer 2 to the absorbent inner layer 4 in paths between bonds as illustrated at X in FIG. 3.

A plain waterproof backing sheet 8 of polyethylene is attached to the outer side of the central absorbent layer 4.

In use, the mat material will be releasably held in a holder such as, for example, in that claimed in British Application No. 8503232 or our co-pending British Application No. 8621916.

It will of course be appreciated that materials other than those specified may be used for the various layers. For example, the outer layer may be of meltblown non-continuous fibres.

I claim:

1. Disposable mat material comprising an abrasion resistant pervious layer of a non-woven web having a basis weight of about 100 g/m$^2$ of bonded polypropylene filaments treated with or containing a surfactant and an absorbent layer having a basis weight of about 190 g/m$^2$ of microfibers, the pervious and absorbent layers being bonded intermittently, characterized in that the bonds are formed by ultrasonic means which acts to burn through the pervious layer and join the fibers in that layer by molten bonds with those in the absorbent layer whereby liquid may readily pass through the pervious layer to the absorbent layer in paths between the bonds.

2. Material as claimed in claim 1 in which absorbent particles and/or fibres are incorporated into the absorbent layer of microfibres.

3. Material as claimed in either claims 1 or 2 in which the bonded areas are in the form of 'pockets' giving an enhanced roughness to the pervious layer.

4. Material as claimed in claim 3 wherein the bonds are arranged in a diamond or square pattern.

5. Material as claimed in claim 4 wherein the distance between bond areas is about 3.5 mm and the distance between the parallel lines of the bond pattern is about 38 mm.

6. Material as claimed in claim 3 in which the absorbent layer is of meltblown polymeric fibres and wood pulp fibres.

7. Material as claimed in claim 6 wherein the absorbent layer comprises about 30 percent polypropylene fibres and 70 percent wood pulp.

8. Material as claimed in claim 3 including a waterproof backing layer positioned on the other side of the absorbent layer from the outer abrasion resistant layer.

9. Material as claimed in claim 8 wherein the backing sheet is joined to the absorbent inner layer either by the same bonds which act to bond the abrasion resistant and the absorbent layers, or with an adhesive or the like.

* * * * *